(12) United States Patent
Memmott et al.

(10) Patent No.: US 6,560,591 B1
(45) Date of Patent: May 6, 2003

(54) SYSTEM, METHOD, AND APPARATUS FOR MANAGING MULTIPLE DATA PROVIDERS

(75) Inventors: James L. Memmott, Pleasant Grove, UT (US); Vernon N. Fuller, Highland, UT (US)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 09/672,500

(22) Filed: Sep. 29, 2000

(51) Int. Cl.$^7$ .............................................. G06F 17/30
(52) U.S. Cl. ......................................................... 707/1
(58) Field of Search ......................... 707/1, 5, 10, 100

(56) References Cited

U.S. PATENT DOCUMENTS

| | | | | |
|---|---|---|---|---|
| 5,745,754 A | * | 4/1998 | Lagarde et al. | 707/102 |
| 5,867,714 A | * | 2/1999 | Todd et al. | 707/10 |
| 6,044,369 A | * | 3/2000 | Black | 707/104.1 |
| 6,275,957 B1 | * | 8/2001 | Novik et al. | 709/318 |
| 6,393,386 B1 | * | 5/2002 | Zager et al. | 370/254 |
| 6,421,658 B1 | * | 7/2002 | Carey et al. | 707/1 |

OTHER PUBLICATIONS

Whitepaper by Julie Schott entitled "CIM System/Device Working Group Modeling Storage," version 1.00, http://www.dmtf.org/var/release/Whitepapers/CIM_Device23_storage_wp.PDF, accessed Sep. 25, 2001 (19 pages).
Whitepaper dated May 28, 1999, entitled "CM_Sensor", Draft 0.1, http://www.dmtf.org/var/release/Whitepapers/CIM_Device23_sensor_wp.PDF, accessed Sep. 25, 2001 (4 pages).
"ACE–SNMP Web Based SNMP Network Management System, An Introductory Overview of SNMP," Diversified Data Resources, Inc., 114 Professional Center Drive, Novato, CA 94947, dated 1999 (32 pages).
"A Brief Tutorial on CORBA," K. Keahey, accessed May 26, 2000, http://www.cs.indiana.edu/hyplan/kksiazek/tuto.html (6 pages).
"A Simple Example of Using CORBA," accessed May 26, 2000, http://www.cs.indiana.edu/hyplan/kksiazek/example.html (2 pages).
SmartCIM™ to DMI Mapper Data Sheet, Smart Technology Enablers, Inc., Oxnard, CA 93030–1260 (2 pages).
"CIM FAQs," http://www.dmtf.org/about/faq/cim.php, accessed Sep. 25, 2001 (3 pages).
"Intelt200 Motherboard CIM Providers for Windows* Frequently Asked Questions," dated 2000, http://kids.intel.com/design/motherbd/cimfaq.htm, accessed Jun. 28, 2000 (4 pages).
Windows Hardware instrumentation Implementation Guidelines, Mar. 2, 1999, Intel Corporation and Microsoft Corporation (coversheet, index, and pp. 1–23).
"XML As a Representation for Management Information—A White Paper," version 1.0, Sep. 15, 1998, http://www.dmtf.org/spec/xmlw.html, accessed Jun. 28, 2000 (17 pages).
"DMTF Education: CIM tutorial: Glossary," http://www.dmtf.org/educ/tutorials/cim/reference/glossary.html, accessed Feb. 3, 2000 (9 pages).
"1 Introduction and Overview," http://www.dmtf.org/spec/cim_spec_v22/, accessed Feb. 3, 2000 (2 pages).
Desktop Management Interface Specification v2.0s, Jun. 24, 1998, pp. 245–247 (Appendix E—Glossary).

(List continued on next page.)

Primary Examiner—Safet Metjahic
Assistant Examiner—Haythim J. Alaubaidi
(74) Attorney, Agent, or Firm—Pillsbury Winthrop LLP

(57) ABSTRACT

In a system according to an embodiment of the invention, a data requester submits a query having a query characteristic to a data resolver. Based at least in part on the query characteristic, the data resolver obtains data responsive to the query from one among a plurality of data providers. Data normalization may also be performed.

18 Claims, 17 Drawing Sheets

OTHER PUBLICATIONS

"Host Resources MIB", http://www.snmp.com/products/hostresource.html, accessed May 25, 2000 (4 pages).

J. Case et al., "A Simple Network Management Protocol (SNMP)," http://www.cis.ohio–state.edu/cgi–bin/rfc/rfc1157.html, dated May 1990, accessed Sep. 25, 2001 (32 pages).

"Concepts and Terminology Important to Understanding WMI and CIM," dated Apr. 23, 1999, http://www.microsoft.com/hwdev/MANAGEABILITY/WMI–CIM.htm, accessed Sep. 25, 2001 (8 pages).

R. McMillan, "DMTF approves CIM 1.0—but will vendors bite?", dated May 1997, http://www.sunsite.uakom.sk/sun-worldonline/swol–05–1997/swol–05–cim.html, accessed Sep. 25, 2001 (3 pages).

E. Horwitt, "CIM creeps ever closer," dated Jun. 21, 1999, http://www.nwfusion.com/cgi–bin/mailto/x.cgi, accessed Sep. 25, 2001 (5 pages).

"Novell and the DMTF: Increasing ROI Through Open Standards," http:www.novell.com/news/leadstories/98/jul22/, accessed Sep. 25, 2001 (3 pages).

\* cited by examiner

| | |
|---|---|
| 1 | data provider identifier | query alias |
| 2 | data provider identifier | query alias |
| 3 | data provider identifier | query alias |
| 4 | data provider identifier | query alias |
| 5 | data provider identifier | query alias | list 150

FIG. 6

| data provider identifier | query alias | available flag |
|---|---|---|
| data provider identifier | query alias | available flag |
| data provider identifier | query alias | available flag |
| data provider identifier | query alias | available flag |
| data provider identifier | query alias | available flag | list 152

FIG. 10

| | data provider identifier | query alias | conversion factors |
|---|---|---|---|
| 1 | data provider identifier | query alias | conversion factors |
| 2 | data provider identifier | query alias | conversion factors |
| 3 | data provider identifier | query alias | conversion factors |
| 4 | data provider identifier | query alias | conversion factors |
| 5 | data provider identifier | query alias | conversion factors | list 154

FIG. 12

| query type | query parameters |
|---|---|

FIG. 13A

| | | | |
|---|---|---|---|
| 1 | data provider identifier | query type alias | parameter conversion information |
| 2 | data provider identifier | query type alias | parameter conversion information |
| 3 | data provider identifier | query type alias | parameter conversion information |
| 4 | data provider identifier | query type alias | parameter conversion information |
| 5 | data provider identifier | query type alias | parameter conversion information | list <u>156</u>

FIG. 13B

SYSTEM, METHOD, AND APPARATUS FOR MANAGING MULTIPLE DATA PROVIDERS

BACKGROUND

1. Field of the Invention

This invention relates to data management. More specifically, this invention relates to managing multiple data providers.

2. Description of Related Art

Many modern computing environments may be characterized at least in part by a distributed model. In most business and academic settings, for example, users share access to resources such as storage, printing, and communications facilities over a local-area network. Distributed applications on a broader scale are supported by connections to larger networks such as the Internet. Yet even within individual computing devices, management of distributed resources and functions is becoming increasingly common. One reason for this trend is the establishment of multitasking operating systems and multiprocessor hardware.

One consequence of distributed systems is that acquisition and management of system information becomes even more important to the proper configuration, operation, maintenance, and troubleshooting of a system. Such information may include data relating to device and/or network operation such as the characteristics and operating status of hardware and software components, the capacity and level of use of network pathways, and the history of usage of resources such as storage and printing devices. When different parts of a network are executing on different platforms, or when different components are supplied by different vendors, problems of incompatibility may arise.

Several distributed management schemes attempt to overcome vendor and platform differences by providing a standard framework for communication of management data. These schemes include:

- SNMP (Simple Network Management Protocol), as described and developed in such documents as RFCs (Requests for Comments) 1157 (May 1990), 1514 (September 1993), and 2578 (April 1999) (available from University of Southern California—Information Sciences Institute (ISI, www.isi.edu), Marina Del Rey, Calif. and also available at www.rfc-editor.org). SNMP uses management models called MIB (management information base) objects or modules;
- CMIP (Common Management Information Protocol), an extension of SNMP that is described in RFC 1189 (October 1990) (available from ISI);
- DMI (Distributed Management Interface), as defined in the DMI 2.0s specification (available from Distributed Management Task Force, Inc. (DMTF, www.dmtf.org), c/o Mackenzie Kesselring, Portland, Oreg.). DMI uses management models called MIF (management information format) files; and
- CIM (Common Information Model), as defined in the CIM specification version 2.2 (Jun. 14, 1999) and CIM schema version 2.3 (available from DMTF).

It may be desirable to support more than one such scheme in any particular system. For example, it is possible that no one scheme will be supported by all of the devices within the system. Alternatively, a component that is managed by one scheme may be added to a system that supports a different scheme. In cases where more than one management scheme exists in the same system, it is possible that multiple schemes may manage information of the same kind under different names, units, or relations or by association with different behaviors. Therefore, while it is desirable to accommodate multiple management schemes, it is also desirable to avoid confusion among the datasets they provide.

A similar problem may be encountered in accessing information from data providers other than distributed management schemes. For example, with respect to an access directed across a network including a number of databases or an access directed across a wider network such as the Internet, it is possible that data responsive to a query relating to any particular subject may be available from more than one provider. A request submitted to an Internet search engine, for example, may be fulfilled in a similar fashion by a number of different search engines. Likewise, a request for a stock quotation may be answered similarly by a number of financial information sites. Requests for directions to a particular location, a review of a particular movie or restaurant, or a price quotation for a new car may also be handled by more than one data provider. In any one of these cases, each such provider may process the request somewhat differently and/or may provide a result in a different format than another provider.

A certain provider may be preferred for a particular type of query, if not for a different type of query. It is desirable to direct a query to a preferred provider. However, a requesting entity may not have the information or the capacity to support a decision as to which provider is preferred for a particular type of query.

BRIEF DESCRIPTION OF THE DRAWINGS

FIG. 6 is a diagram showing a priority list;

FIG. 10 is a diagram showing a priority list;

FIG. 12 is a diagram showing a priority list;

FIG. 13A is a diagram showing an example of a query;

FIG. 13B is a diagram showing a priority list;

DETAILED DESCRIPTION OF THE INVENTION

It is desirable to free a requesting entity from the burden of having to select a particular provider. Additionally, it is desirable to return a result for a query in a form that is independent of the particular provider that processed the query.

Figure 1:
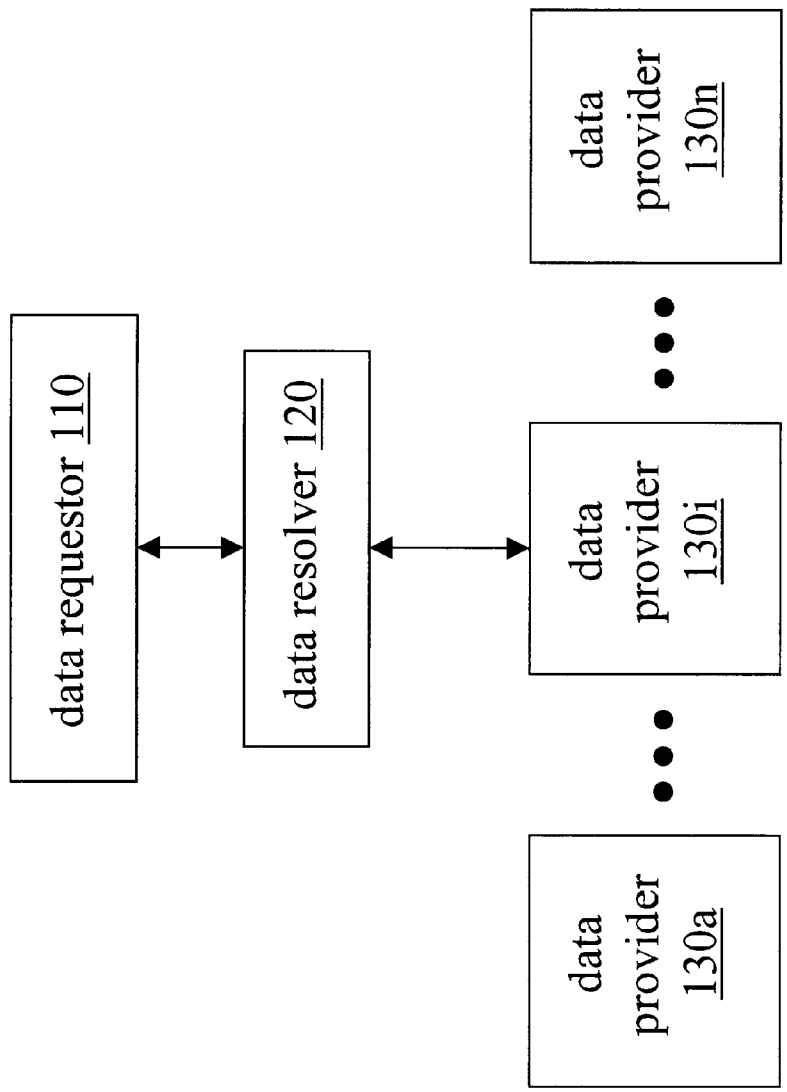
FIG. 1 is a block diagram of a system according to an embodiment of the invention.

FIG. 1 shows a system according to an embodiment of the invention. In this system, data requestor 110 forwards a query to data resolver 120. Data requestor 110 may be any software application executing on the same machine as data resolver 120. For example, data requestor 110 may be a system monitoring agent or data collection agent, such as a historian component that logs system characteristics or a system health monitor that records and analyzes system resource usage. Alternatively, data requestor 110 may be any application executing on a different machine and communicating with data resolver 120 over a wired or wireless communications link. For example, data requestor 110 may be an administrative application executing on a network server and data resolver 120 may be an application executing on a client in the same network.

Possible formats for the query received from data requestor 110 include object-oriented formats such as Managed Object Format (MOF) and syntaxes such as Extensible Markup Language (XML). For example, the query may conform to at least one among the distributed management schemes referenced above (SNMP, CMIP, DMI, CIM) or to a similar scheme such as Windows Management Interface (WMI, Microsoft Corp., Redmond, Wash.). Included in the query is a query characteristic that identifies the information requested and/or the subject matter of the query. For example, a query relating to a DVD (Digital Versatile Disk) drive may include an object class (e.g. MediaAccessDevice), a subclass (e.g. DVDDrive), and an indication of the particular drive property about which information is desired.

Data resolver 120 receives the query and chooses one from among a set of lists according to the query characteristic. Each entry of the selected list (which may also be called a 'priority list') is associated with a data provider 130, and the entries in the list are ordered according to a predetermined preferability of the corresponding data provider with respect to the query characteristic.

Data resolver 120 forwards a request based upon the query to the data provider 130$i$ that is indicated by a entry chosen from the selected list by order of preferability. A data provider 130 may be a hardware structure (such as a sensor) or software structure (such as a registry file) that provides management information. For example, data provider 130 may be an object manager or database that collects management information and services queries according to a particular distributed management scheme. Data resolver 120 receives data responsive to the request from the data provider 130$i$, and a response based at least in part upon the data is then returned by data resolver 120 to data requestor 110.

As described above, a system including a data resolver 120 allows a data requestor to submit all queries in a common namespace and across a single query channel. Such a system is also expandable, as support for additional data providers may be added by updating the priority lists.

Figure 2:
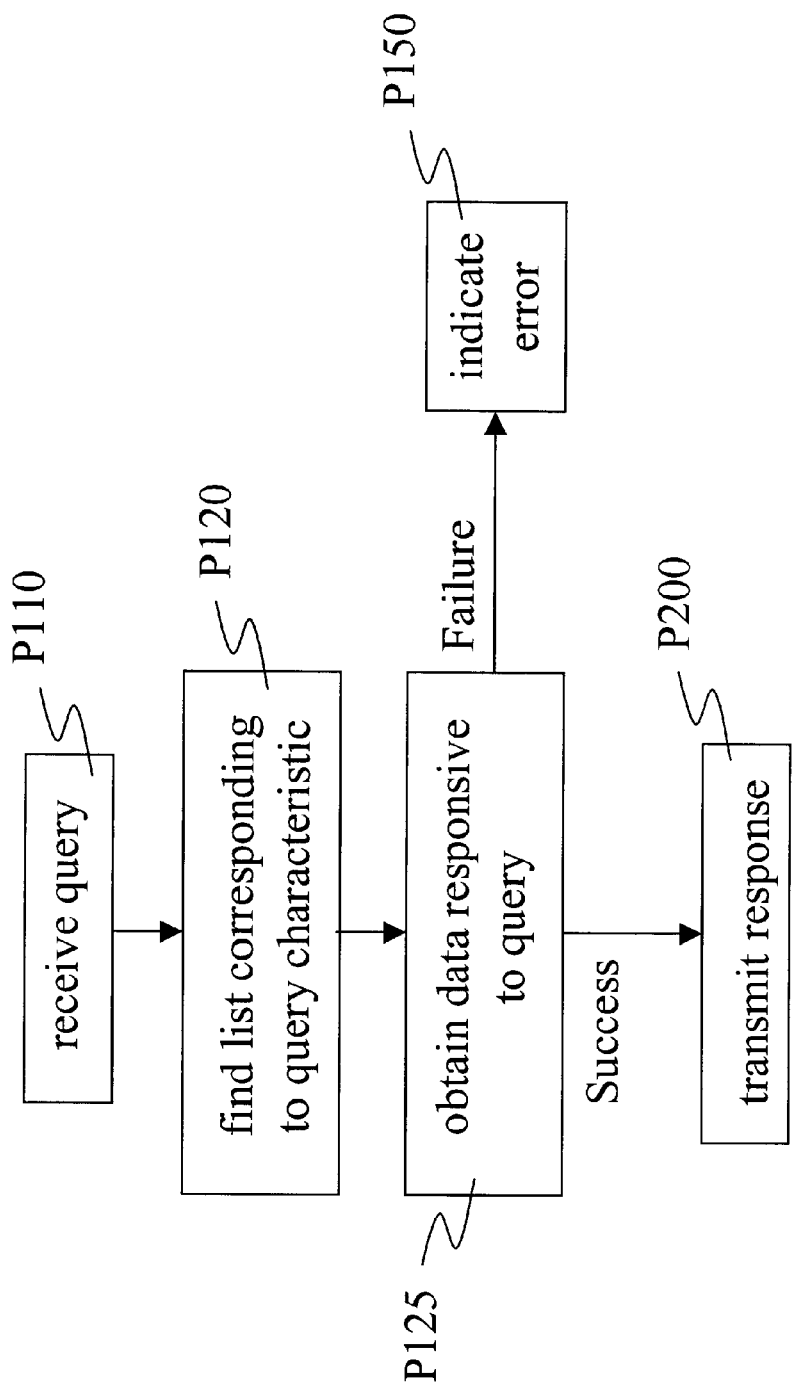
FIG. 2 is a flow chart of an implementation of a data resolver 120 according to an embodiment of the invention.

FIG. 2 is a flow chart that shows the operation of an implementation of data resolver 120 according to an embodiment of the invention. In query reception task P110, a query having a query characteristic is received, for example, from a data requestor 110 as described above. In another application of data resolver 120, the query may be received from a data requestor who is a human user (e.g., via a keyboard or other data input device over a wired or wireless communications link).

In selection task P120, a list corresponding to the query characteristic is selected. As noted above, the entries in this list are ordered in a sequence that is established at least in part by their relative preferabilities or priorities with respect to the query characteristic. In data collection task P125, data providers 130 are visited in a sequence according to the order of the entries in the selected list until data responsive to the query is obtained. If the list is exhausted before such data is obtained, data collection task P125 fails and an error is indicated in error handling task P150. If data is obtained, data resolver 120 transmits a response to the query (e.g. to the data requestor) in response task P200.

Figure 3:
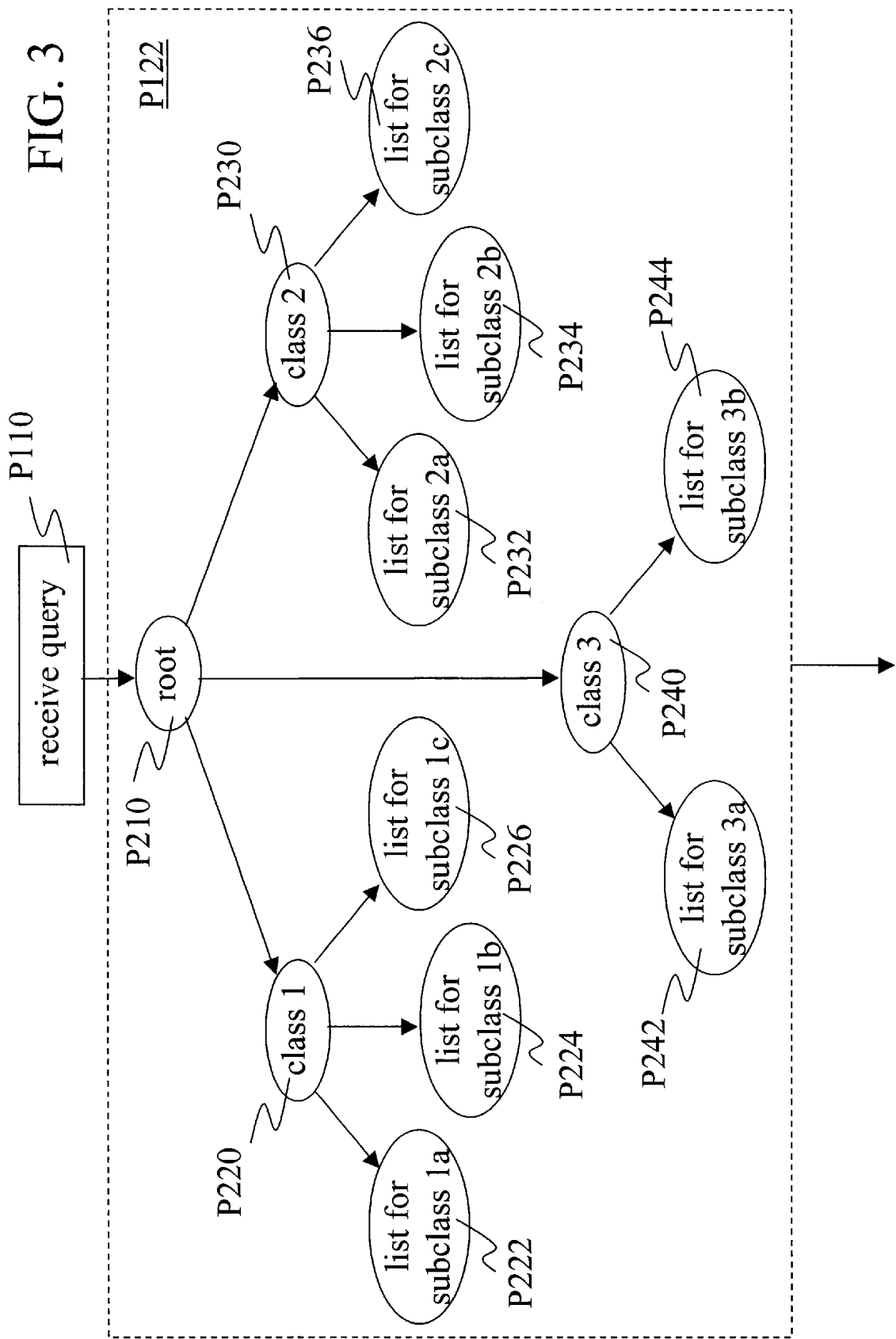
FIG. 3 is a flow chart of an implementation P122 of selection task P120.

FIG. 3 shows one implementation P122 of selection task P120 as a decision tree. Such an implementation may be used, for example, in situations where the types of data to which a query characteristic may relate can be arranged into a hierarchical grouping. In this example, a first classification decision is made at node P210. Depending upon that decision, a second classification decision is made at one among nodes P220, P230, and P240. The accumulated results of the classification decisions determine which list (i.e. which among the leaves P222, P224, P226, etc.) will be selected. The structure of the decision tree for a particular application need not be balanced or symmetric, and the number of nodes in the path to any particular leaf may be arbitrarily long.

One example of a walk through a selection task P120 implemented as a decision tree having several levels of nodes is now described. In this example, the query received in query reception task P110 relates to the capacity of a DVD (Digital Versatile Disk) drive that is internal to the system. At a root node, a decision is made as to whether the query characteristic relates to a hardware device or a software application. The "hardware device" path is chosen, and the decision at the next node relates to whether the query characteristic corresponds to a storage device or a display device. The "storage device" path is chosen, and the decision at the next node relates to whether the storage device is internal to the system or external. In similar fashion, subsequent decisions are made as to whether the drive is removable or permanent, whether the storage medium is optical or magnetic, and whether the drive format is DVD or CD-ROM. At the final node, a decision is made to select a list of data providers arranged by preference with respect to information relating to a capacity of the internal DVD drive. In a similar manner, other paths through the decision tree may lead to lists corresponding to queries relating to other hardware components (i.e. CPU speed and/or temperature, hard disk drive status and/or capacity, etc.) or to software components (e.g. socket assignments, task schedules, shared resource usage, etc.).

Figure 4:
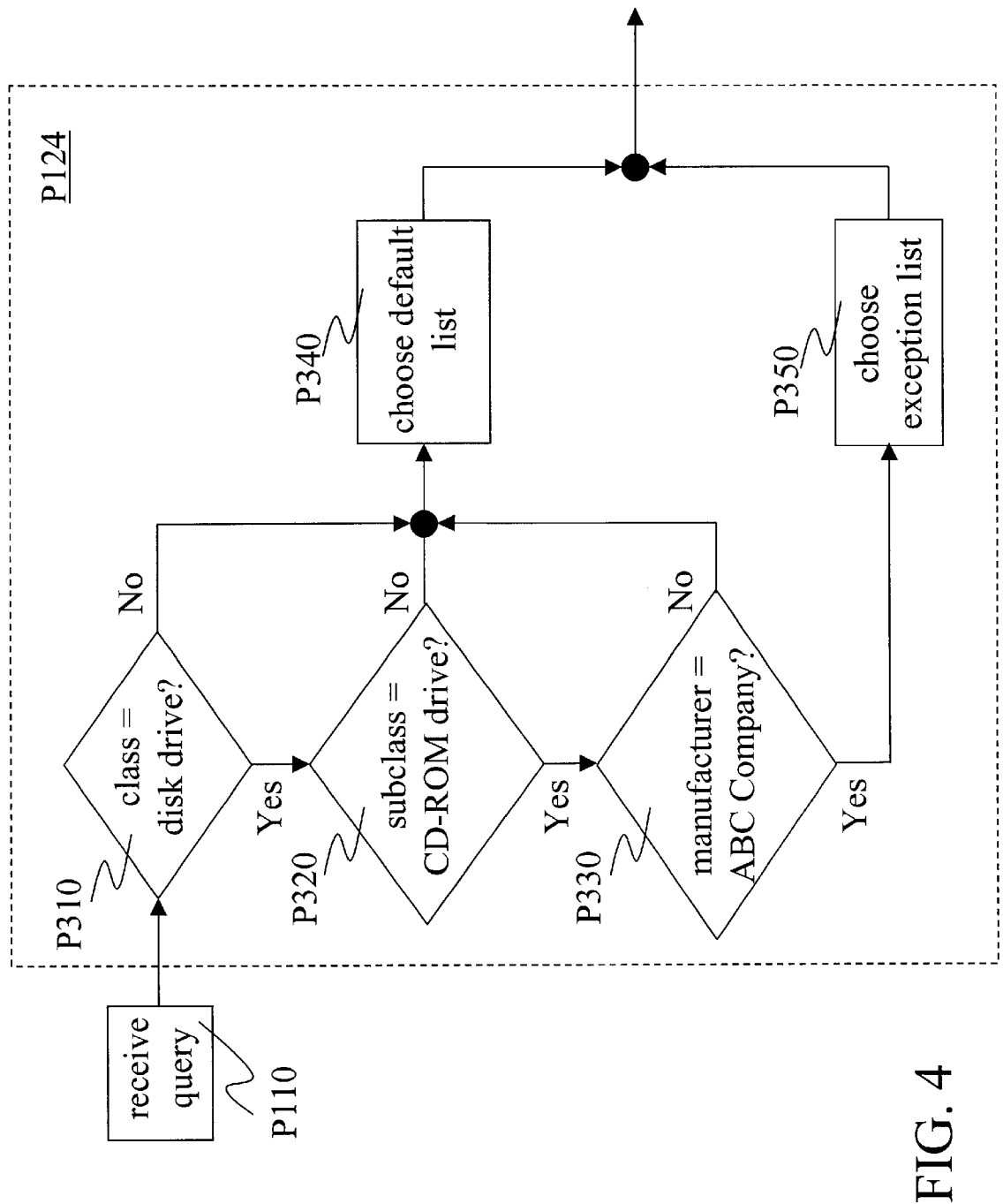
FIG. 4 is a flow chart of an implementation P124 of selection task P120.

In certain applications, it may not be necessary to provide a separate list for each possible query characteristic, as one or more default lists may handle many or most possible queries appropriately. In such cases, the default list or lists may be supplemented by exception lists that handle other possible queries. FIG. 4 shows an alternate implementation P124 of selection task P120 suitable for one such application. In this example, the only exception is for queries relating to a CD-ROM drive manufactured by ABC Company. As shown in FIG. 4, a default priority list is selected in task P340 if the query characteristic does not relate to a disk drive (task P310), or if the query characteristic relates to a disk drive but does not relate to a CD-ROM drive (P320), or if the query characteristic relates to a CD-ROM drive that is not manufactured by ABC Company (task P330). If all of tasks P310, P320, and P330 are true, however, then the exception list is selected in task P350.

In many cases, a decision structure that uses one or more default lists will consume less storage area than one using a full decision tree. A configuration using default lists may also take less time to configure. Another possible decision structure is a lookup table (e.g. indexed by the query characteristic), which may provide a faster decision but may also consume much more storage area.

Figure 5:
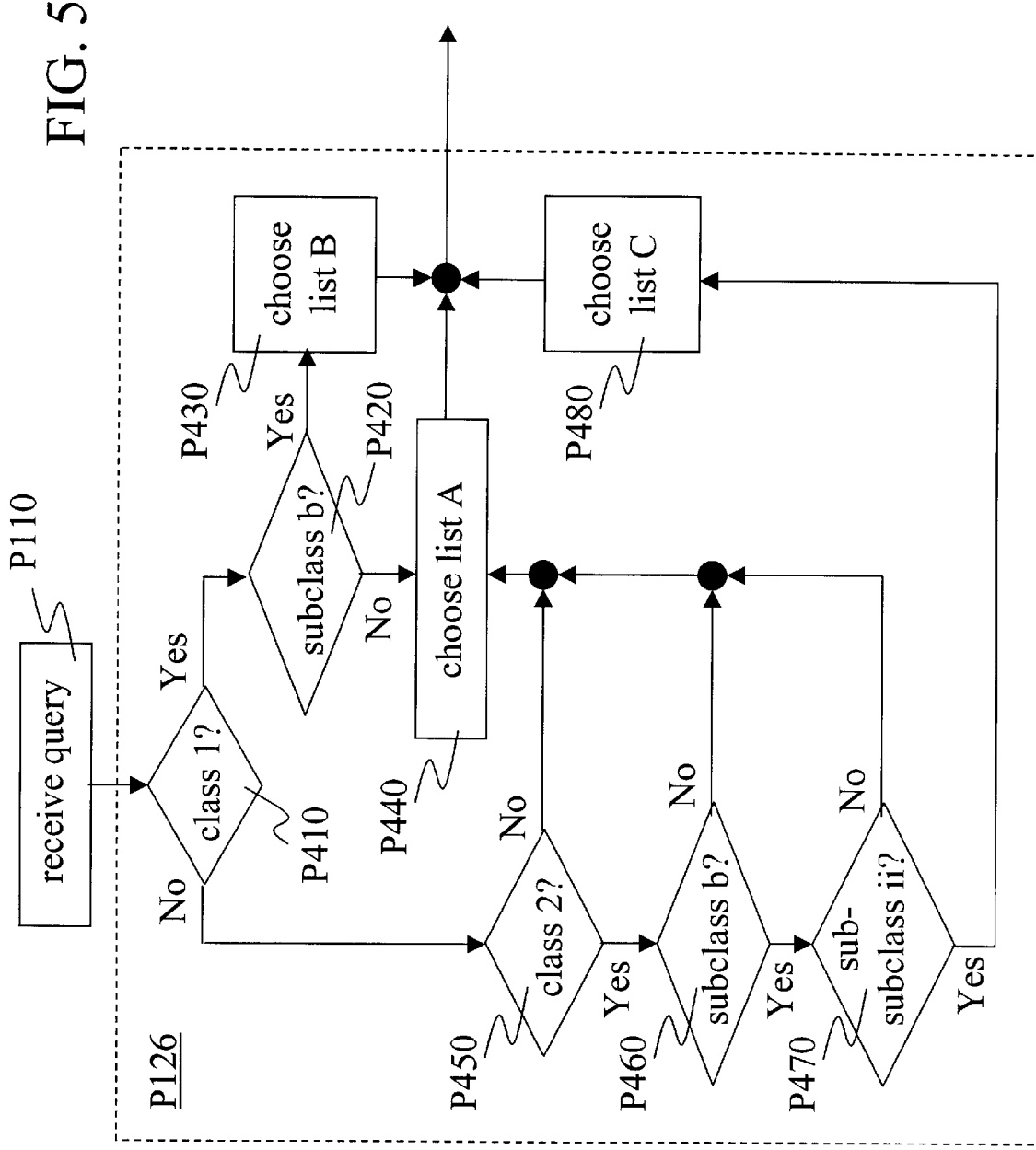
FIG. 5 is a flow chart of an implementation P126 of selection task P120.

FIG. 5 shows an alternate implementation P126 of selection task P120. Such an implementation may be used to handle a situation having a default case and several exception cases. In this particular example, a query characteristic that indicates class 1 and sub-class b is associated with exception list B. A query characteristic that indicates class 2, sub-class b and sub-sub-class ii is associated with exception list C. All other query characteristics are associated with default list A. In a similar manner, selection between a number of default lists (e.g. for hardware vs. for software; for components supplied with the system as originally purchased or configured vs. for optional components, upgrade components, and/or components added later; etc.) may also be supported.

As shown in FIG. 6, a list (or 'priority list') 150 may be configured as an ordered list of entries. The order of preference in which the various entries are arranged may be determined with respect to criteria such as availability, accuracy, and/or reliability. This order (as indicated by the column of numbers on the left-hand side of the figure) may be represented implicitly (e.g. by the relative positions of the entries within the list) or explicitly (e.g. by including a priority order tag within each entry). One advantage to using an explicit representation is that the order may be updated without moving the entries. Each entry has a data provider identifier, which may be any string (such as a network address, memory or port address, packet header, etc.) that unambiguously indicates a particular one among the data providers 130.

As shown in FIG. 6, each list entry may also include a query alias. Each query alias is a string that represents a mapping of at least a portion of the query received in task P110 into the namespace of the data provider indicated by the corresponding data provider identifier. In a case where all of the data providers represented in the list recognize the query received in task P110, the query alias portion of each entry may be omitted. In a case where all of the data providers represented in the list recognize some other form of the query, associating a single instance of this recognized form with the list itself may be more efficient than replicating the recognized form as a query alias for each individual entry.

Refreshing of the priority lists may be general or selective and may occur at installation or afterward. In one example, a priority list is retrieved from permanent storage at power-up and is updated (e.g. in accordance with the system configuration) as it is loaded into run-time memory.

Figure 7:
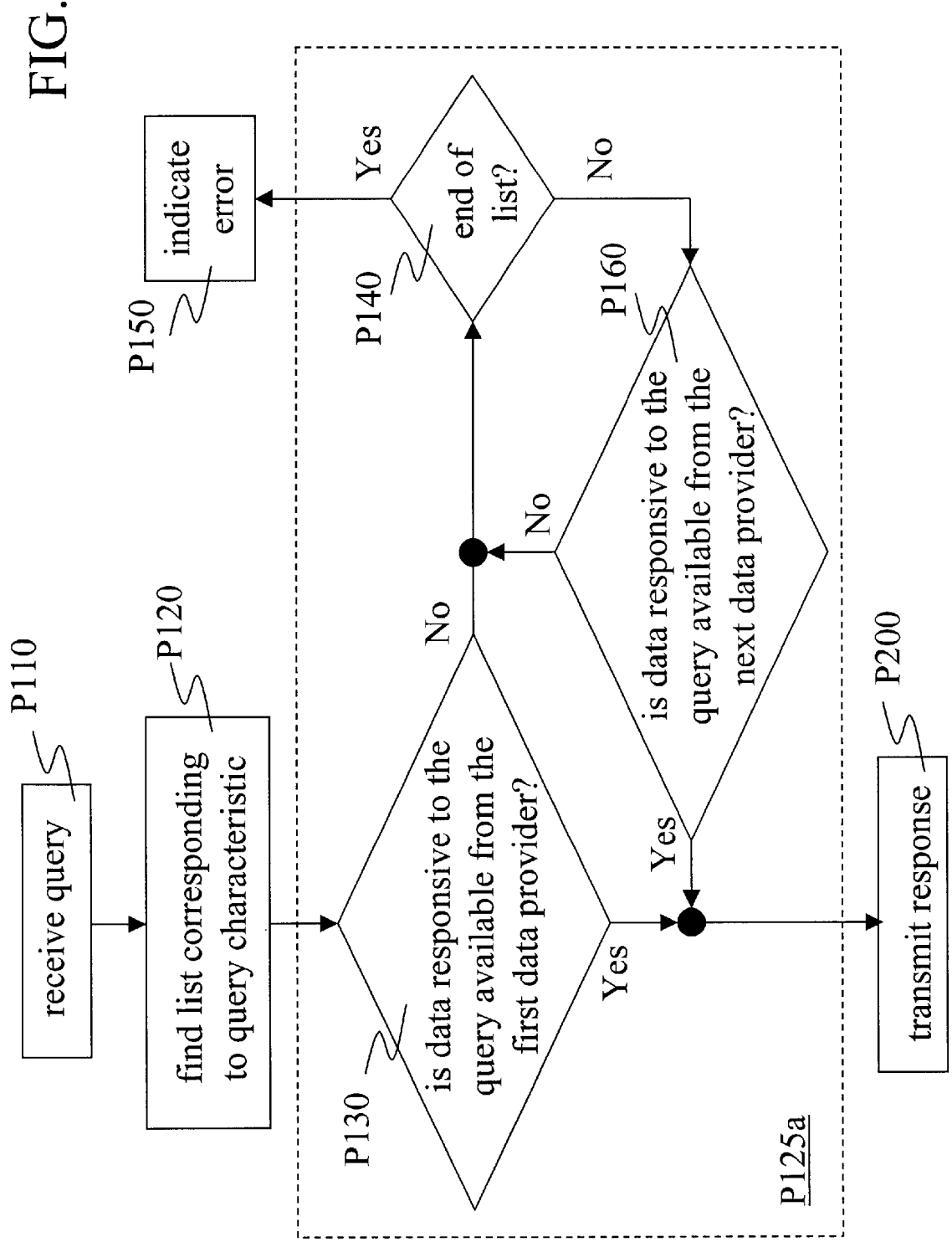
FIG. 7 is a flow chart of an implementation of a data resolver 120 including an implementation P125a of data collection task P125.

FIG. 7 is a flow chart that shows the operation of an implementation of data resolver 120 according to an embodiment of the invention, including an implementation P125a of data collection task P125. In evaluation task P130, the first entry on the list (i.e. the entry having the highest priority) is evaluated to determine whether data responsive to the query is available from the corresponding data provider. Evaluation task P130 may include preparing and forwarding a request to the data provider and analyzing any response from the data provider. If such data is not available (for example, because the data provider corresponding to the entry is not present in the system, is not on-line, is not responding to the request, or has returned an invalid response), then in loop test task P140 the presence of more entries on the list is determined (in another implementation, the unavailability of data from the data provider may also be reported to the data requester).

If no more entries remain in the list (for example, if an end-of-list marker is encountered), then an error is indicated in error handling task P150. For example, an error response may be returned to the data requestor. If more entries remain, however, then in evaluation task P160 the next entry in the list is evaluated (as in task P130 described above). Once data responsive to the query has been obtained, a response based on the data is transmitted to the data requestor in response task P200.

Figure 8:
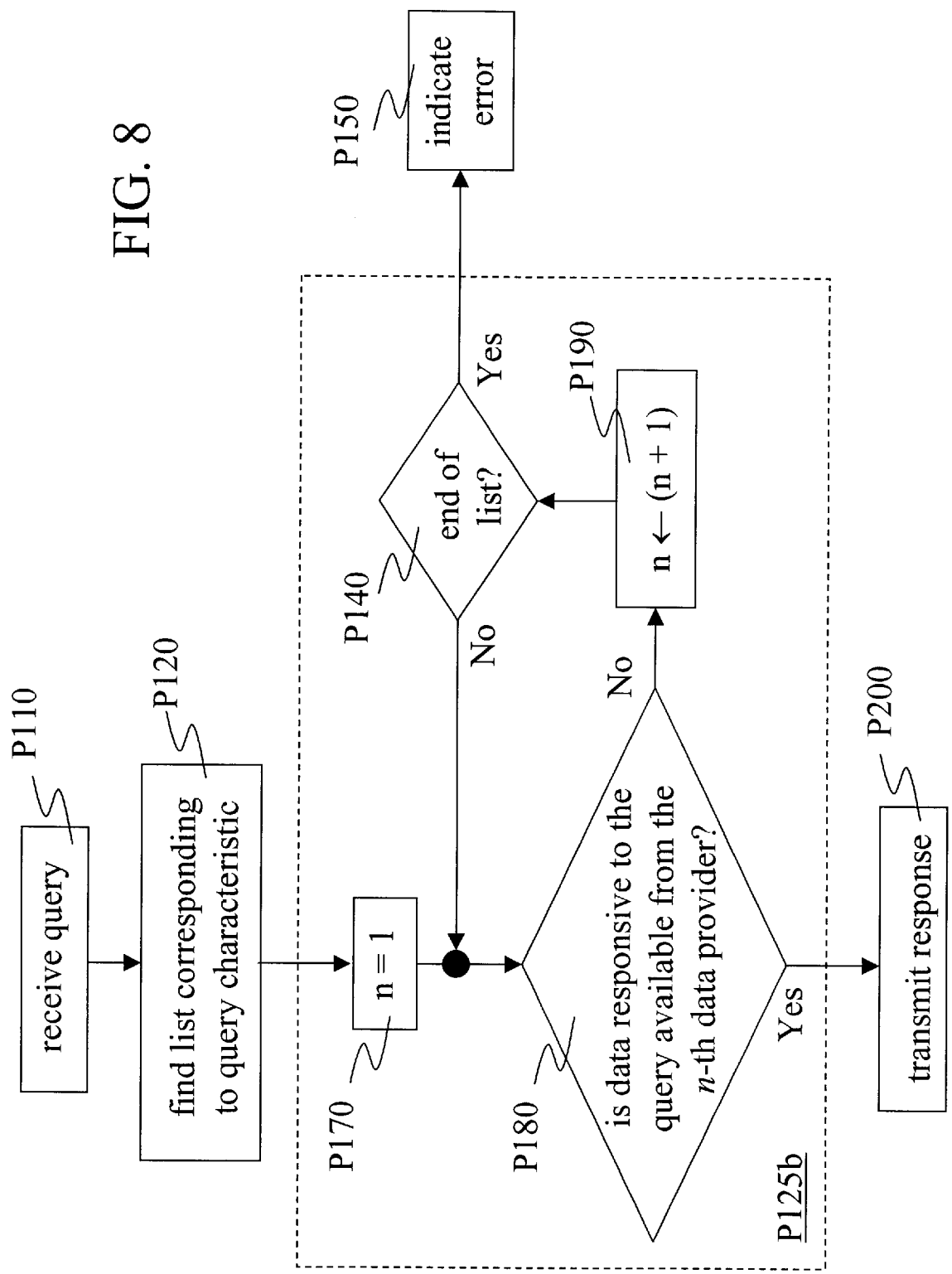
FIG. 8 is a flow chart of an implementation of a data resolver 120 including an implementation P125b of data collection task P125.

FIG. 8 shows a flowchart for an implementation of data resolver 120 according to an embodiment of the invention, including an implementation P125b of data collection task P125 that performs an alternate procedure of progressing down the selected list in a priority-based fashion. In initialization task P170, an entry counter n is initialized (for example, to have a value of one). In evaluation task P180, the n-th entry is evaluated (e.g. as described above) to determine the availability of data responsive to the query from the corresponding data provider. If the data is not available, then in update task P190 the value of the entry counter is updated (e.g., incremented) and the new value of the entry counter is tested in loop test task P145 to determine whether further list entries remain. If no such entries remain, then an error is indicated in error handling task P150 as described above. Procedures for progressing down the selected list in a priority-based fashion other than those illustrated in FIGS. 7 and 8 are also possible.

Figure 9:
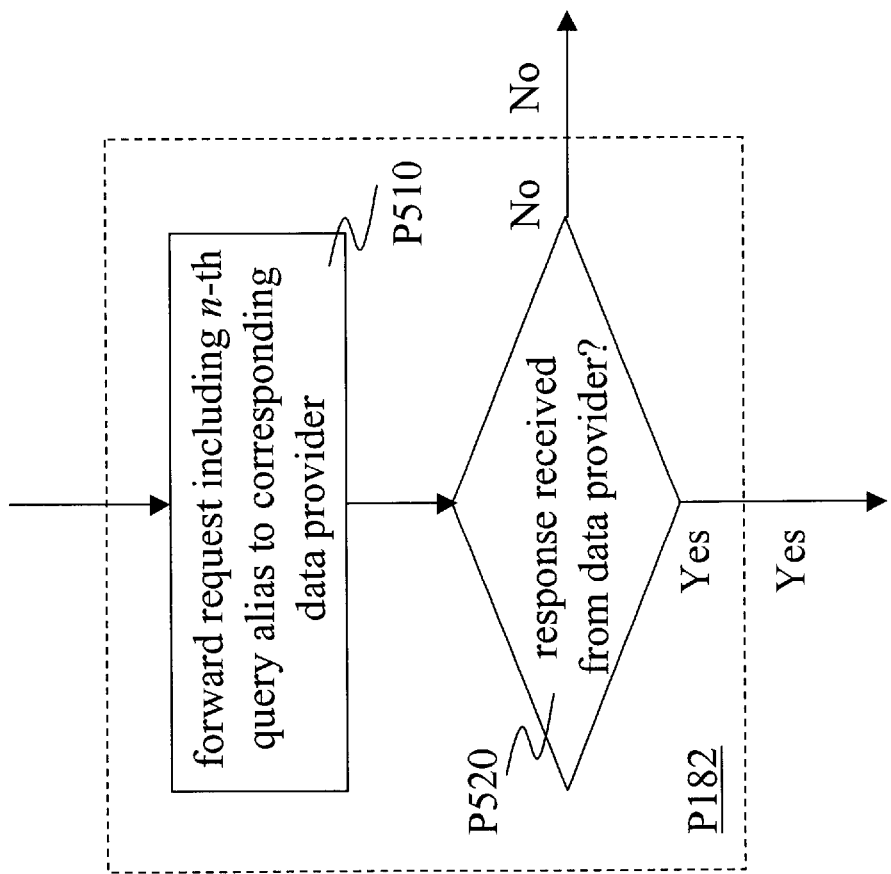
FIG. 9 is a flow chart of an implementation P182 of evaluation task P180.

FIG. 9 shows one implementation P182 of evaluation task P180 (evaluation tasks P130 and P160 may be implemented analogously). In request forwarding task P510, a request including the n-th query alias is forwarded to the corresponding data provider. If the query alias represents a complete query from the namespace of the corresponding data provider, then data resolver 120 may forward the query alias itself as the request. Alternatively, data resolver 120 may supplement the query alias with specific information from the query and/or the query characteristic to form the request. If it is determined in response evaluation task P520 that no response has been received from the data provider (e.g., a time-out occurs, the response is determined to be invalid, or the query is rejected), then the test fails. Otherwise, the data provider's response to the request is forwarded to the next task.

FIG. 10 shows an alternative implementation of a priority list 152 for a case in which the availability of data from particular data providers may be determined at least in part in advance. In this example, each entry includes an available flag that indicates whether data responsive to the query is available from the data provider indicated by the corresponding data provider identifier. These flags may be updated (together, in sets, and/or individually) periodically or in response to events such as power-up, user registration, and/or system reconfiguration or. upgrading. As noted above, the query alias portion of the list entries may be omitted in cases where all of the data providers represented in the list recognize a common query form.

Figure 11:
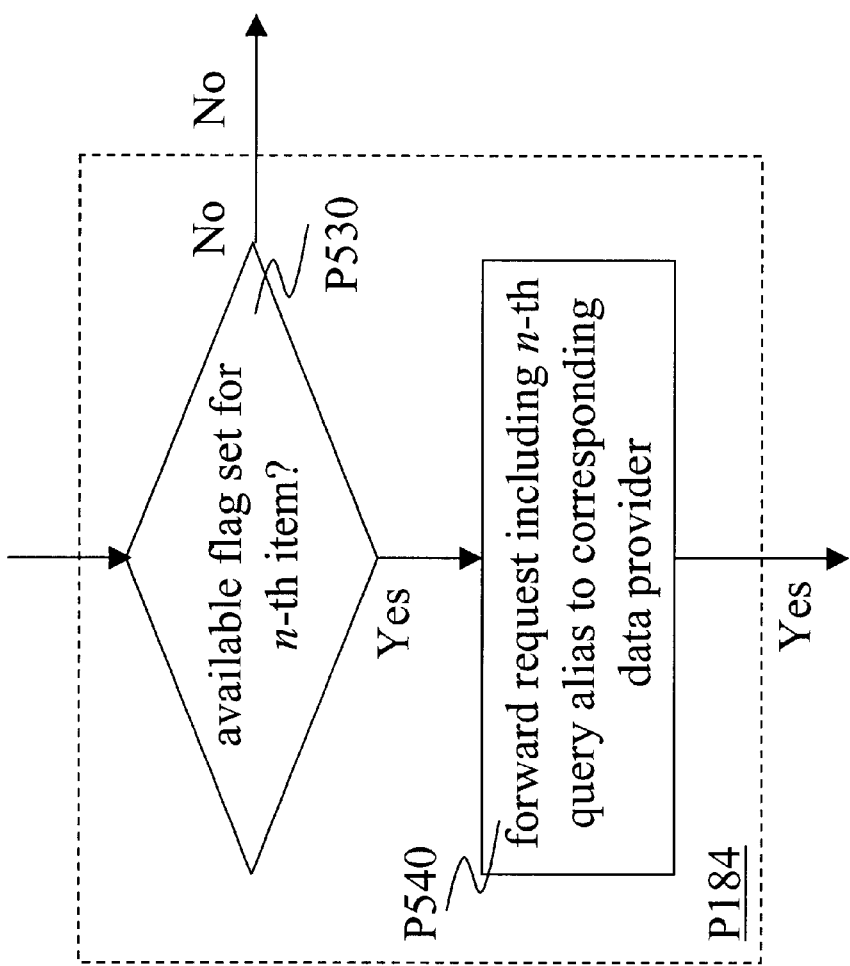
FIG. 11 is a flow chart of an implementation P184 of evaluation task P180.

FIG. 11 shows an alternative embodiment P184 of evaluation task P180 that references the available flag of each visited entry. In flag test task P530, the status of the flag corresponding to the n-th entry is checked. If the flag indicates that data responsive to the query is not available from the corresponding data provider, then the task fails. Otherwise, a request including the corresponding query alias is forwarded to the data provider in request forwarding task P540. In a further implementation, data received from the data provider may be tested for validity before it is forwarded to the next task.

In response task P200, a response based at least in part on the data obtained from the data provider is transmitted to the data requester. Response task P200 may include formatting the data into a response format appropriate for presentation to data requester 110. For example, it may be necessary to include information in the response to establish a context for the data (e.g. information similar to the query characteristic), and/or it may be necessary to present portions of the data in a specified sequence within the response. In an exemplary implementation, communications between the data requestor and data resolver 120 conforms to a distributed management scheme as referenced above.

As the response format may change with the nature of the query, information regarding a corresponding response format may be associated with each priority list. Alternatively, information regarding the response formats that correspond to several or all possible queries may be stored in a single data structure indexed, for example, by the query characteristic. Data processing operations (such as data normalization as described below) may also be performed on the data before the response is transmitted.

One problem that may be encountered in dealing with multiple data providers is that responses by different providers to the same query may represent similar values yet appear completely different. In the CIM distributed management scheme, for example, free disk space is reported in units of bytes, while in the DMI scheme, free disk space is reported in units of kilobytes. FIG. 12 shows an alternative implementation 154 of a priority list in which each entry includes one or more conversion factors. These factors, which are associated with a particular data provider and query characteristic, may be used during response formatting to normalize the data obtained from the data provider to a common reference.

In some applications, the relative preferabilities of the various data providers may be determined from only a portion of the query characteristic. For example, the same relative preferabilities may be associated with a group of queries related by at least one common feature, such as all queries relating to a particular hardware or software component or all queries within the same class or subclass. In such cases, it may be desirable to divide the query characteristic into two sections. FIG. 13A shows an example of a query characteristic that includes a query type and one or more query parameters. In this example, the relative preferabilities of the various data providers are based on the query type, while the query parameters indicate the specific information requested in a particular query (e.g. one or more properties as identified in the query). For example, the query type may indicate that the query relates to the CPU, while the query parameters may indicate whether the query relates to the type, speed, version, or temperature of the CPU.

FIG. 13B shows an alternative implementation 156 of a priority list in which each entry includes a query type alias and parameter conversion information. In one example, the parameter conversion information includes a set of item pairs that is indexed by the query parameters, each item pair including (1) a request format item which relates the query parameters to a request format appropriate for presentation to the corresponding data provider and (2) a response format item which relates data received from the data provider to a response format appropriate for presentation to the data requester. Evaluation of a list entry in this case may include preparing a request that is based at least in part on the query type alias and the indicated request format item and forwarding the request to the corresponding data provider. Responding to the data requestor may include preparing a response that is based at least in part on data received from the data provider and the indicated response format item and transmitting the response to the data requestor.

Figure 14:
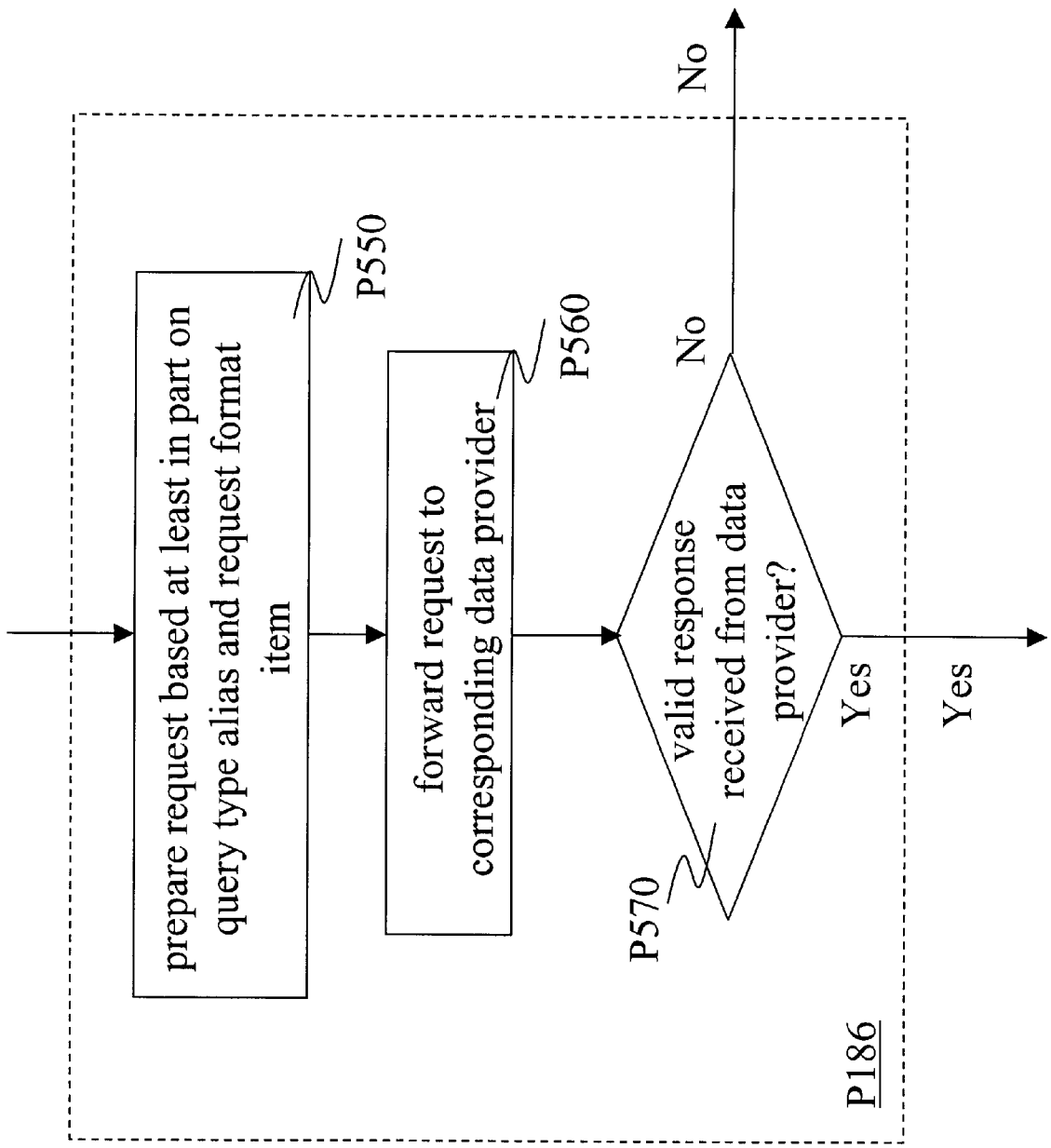
FIG. 14 is a flow chart of an implementation P186 of evaluation task P180.

FIG. 14 shows a flowchart for an implementation P186 of evaluation task P182. In request preparation task P550, a request is prepared which relates to the query received in task P110 and is appropriate for presentation to the indicated data provider. This request is forwarded to the corresponding data provider in forwarding task P560, and the provider's availability is determined in response evaluation task P570.

Although the discussion above relates to obtaining data from one or more data providers (e.g. performing a 'Get' operation), it may also be desirable to send data to one or more data providers (e.g. to perform a 'Set' operation) in a similar fashion. In such case, the query received from the data requester (and the corresponding request that is forwarded to the data provider) specify data being sent rather than data being requested. For a binary operation (e.g. toggling a flag), it may be sufficient to forward a request based on the query alias. For other operations, a data payload may be included in one or more query parameters of a query characteristic as shown in FIG. 13A. Operations such as request formatting and response formatting (e.g. to return an acknowledgement to the data requester) may also be performed as described above.

In one example, the data requestor sends a query including a query characteristic that specifies a disk use watermark in megabytes. The appropriate priority list indicates that a data provider which uses the CIM distributed management scheme is preferred for this query characteristic. The corresponding list entry also indicates that the request format appropriate for this data provider includes the property 'DiskIsFullThreshold' and a value in kilobytes. The request (including a converted data value) is formatted and forwarded to the data provider, and data received from the data provider is formatted and transmitted to the data requestor as an acknowledgement response.

Figure 15:
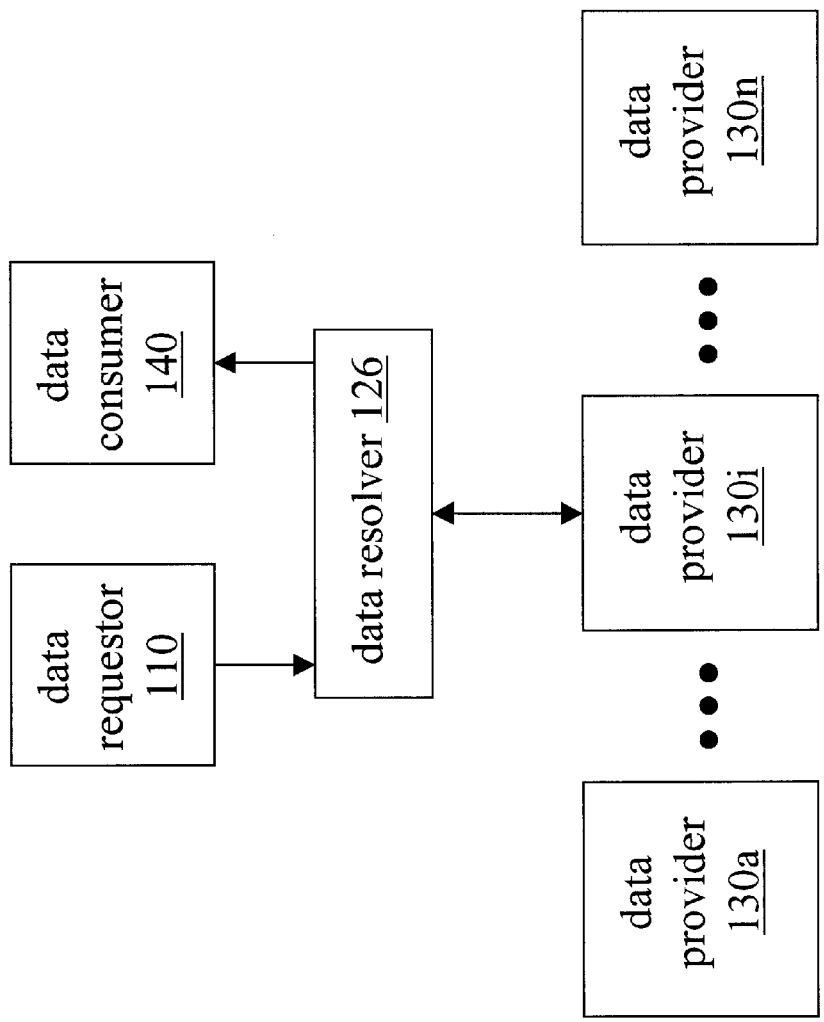
FIG. 15 is a block diagram of a system according to an embodiment of the invention.

FIG. 15 shows a system according to a further embodiment of the invention. In this example, data resolver 126 receives a query from data requestor 110 and transmits a response to data consumer 140. In another implementation, the system may include more than one data requestor and/or consumer.

Figure 16:
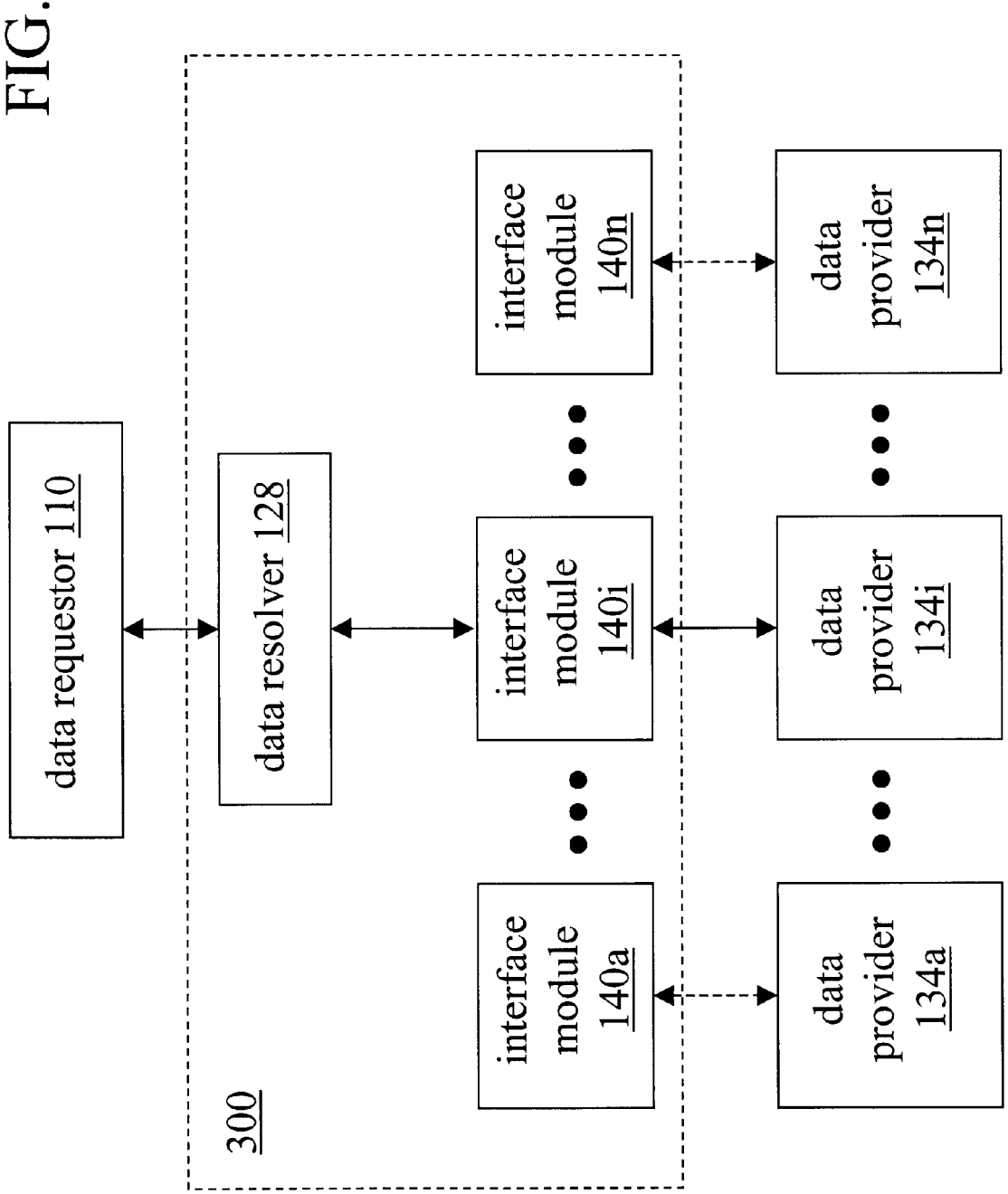
FIG. 16 is a block diagram of a system including an apparatus 300 according to an embodiment of the invention.

FIG. 16 shows an apparatus 300 according to yet another embodiment of the invention. In this implementation, data resolver 128 communicates with at least some of the data providers 134 through interface modules 140. For example, data resolver 128 may forward the query alias (or the query type alias and query parameters, as appropriate) to the corresponding interface module 140, which may perform some or all of the appropriate request formatting, request forwarding, and data receiving operations. Interface module 140 may also receive data responsive to the request from the data provider and may perform some or all of the appropriate data processing and response formatting operations before forwarding the data (or the response) to data resolver 128 (or, in another application, directly to the data requester). In one example, an interface module 140 supports communication between data resolver 128 and another machine through remote procedure call (RPC).

Use of one or more interface modules 140 may be useful in bridging interfaces between networks, in resolving hardware-related issues such as signal incompatibilities, and/or in executing software-related tasks such as function call or protocol mapping. Additionally, incorporating interface modules into the apparatus allows a design that is more easily upgraded and extended. For example, an additional distributed management scheme may be supported with only limited modification to data resolver 128 by adding an appropriate interface module 140.

Figure 17A:
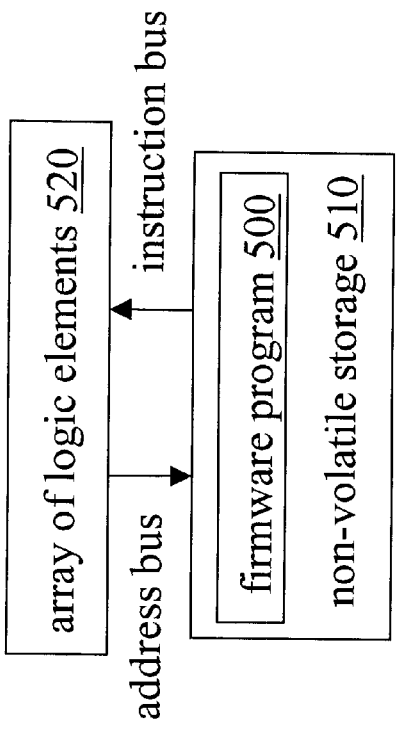
FIG. 17A is a block diagram of an implementation of an apparatus according to an embodiment of the invention.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit or as a circuit configuration fabricated into an application-specific integrated circuit or field-programmable gate array. Likewise, as shown in FIG. 17A, the invention may be implemented in part or in whole as a firmware program 500 loaded or fabricated into non-volatile storage 510 (such as read-only memory or flash memory) as machine-readable code, such code being instructions executable by an array of logic elements 520 such as a microprocessor or other digital signal processing unit.

Figure 17B:
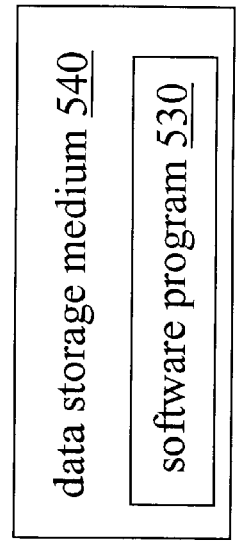
FIG. 17B is a block diagram of an implementation of an apparatus according to another embodiment of the invention.

Further, as shown in FIG. 17B, the invention may be implemented in part or in whole as a software program 530 loaded as machine-readable code from or into a data storage medium 540 such as a magnetic, optical, magnetooptical, or phase-change disk or disk drive; a semiconductor memory; or a printed bar code. Thus, the present invention is not intended to be limited to the embodiments shown above but rather is to be accorded the widest scope consistent with the principles and novel features disclosed in any fashion herein.

We claim:

1. A method comprising:
   receiving a query, said query including a query characteristic;
   selecting one among a plurality of lists, said selecting being based on the query characteristic; and
   transmitting a response relating to said query,
   wherein said selected list comprises an ordered plurality of entries, each among said ordered plurality of entries corresponds to one among a plurality of data providers, the response is based at least in part on data provided by one among said plurality of data providers, said ordered plurality of entries is ordered according to a predetermined preferability of the corresponding data provider with respect to the query characteristic, each among said ordered plurality of entries includes a corresponding query alias, and for each among said ordered plurality of entries, the corresponding query alias includes a mapping of a least a portion of the query into a namespace of the corresponding data provider.

2. The method according to claim 1, wherein the query conforms to a standard framework for communication of management data.

3. The method according to claim 1, wherein said selecting includes following a path through a decision tree.

4. The method according to claim 1, wherein said selecting includes choosing between at least one default list and at least one exception list.

5. The method according to claim 1, wherein said transmitting a response includes converting the data.

6. The method according to claim 5, wherein said converting the data includes normalizing the data.

7. The method according to claim 1, wherein the data is provided to an interface module coupled to said one among said plurality of data provides.

8. The method according to claim 1, wherein each among said ordered plurality of entries includes a priority order tag.

9. A method comprising:
   receiving a query, said query including a query characteristic, wherein said query characteristic includes a query type and at least one query parameter;
   selecting one among a plurality of lists, said selecting being based on the query characteristic; and
   transmitting a response relating to said query,
   wherein said selected list comprises a plurality of entries, the response is based at least in part on data provided by one among said plurality of data providers, each among said plurality of entries includes a query type alias and parameter conversion information, and for each among said plurality of entries, the corresponding query type alias comprises a mapping of at least a portion of the query type into a namespace of the corresponding data provider.

10. The method according to claim 9, wherein the parameter conversion information includes at least one among a request format item and a response format item.

11. An apparatus comprising a data storage medium, said data storage medium having machine-readable code stored thereon, the machine-readable code including instructions executable by an array of logic elements, the instructions defining a method to:
    receive a query, said query including a query characteristic;
    select one among a plurality of lists, said selection being based on the query characteristic; and
    transmit a response relating to said query,
    wherein said selected list comprises an ordered plurality of entries, each among said ordered plurality of entries corresponds to one among a plurality of data providers, the response is based at least in part on data provided by one among said plurality of data providers, and said ordered plurality of entries is ordered according to a predetermined preferability of the corresponding data provider with respect to the query characteristic.

12. An apparatus comprising:
    a decision structure configured and arranged to receive a query characteristic, and
    a plurality of priority lists,
    wherein said decision structure selects one among said plurality of priority lists based at least in part on the query characteristic, said selected priority list comprises a plurality of entries, each among said plurality of entries corresponds to one among a plurality of data providers, and said plurality of entries is ordered according to a predetermined preferability of the corresponding data provider with respect to the query characteristic.

13. An apparatus comprising:

a data resolver configured and arranged to receive a query including a query characteristic, said data resolver having:
- a decision structure configured and arranged to receive a query characteristic; and
- a plurality of priority lists, and a plurality of interface modules configured and arranged to receive information relating to the query characteristic from said data resolver, wherein said decision structure selects one among said plurality of priority lists based at least in part on the query characteristic, said selected priority list comprises a plurality of entries, each among said plurality of entries corresponds to one among a plurality of data providers, each among said plurality of interface modules corresponds to one among the plurality of data providers, one among said plurality of interface modules receives data relating at least in part to the query characteristic from the corresponding data provider, and said plurality of entries is ordered according to a predetermined preferability of the corresponding data provider with respect to the query characteristic.

14. A system comprising:

a data resolver configured and arranged to receive a query including a query characteristic; and a plurality of data providers, wherein at least two among said plurality of data providers are configured and arranged to supply data responsive to said query, said data resolver selects one from among said plurality of data providers based at least in part on the query characteristic, and said data resolver selects one from among said plurality of data providers based at least in part on a predetermined preferability of the corresponding data provider with respect to the query characteristic.

15. A program code storage device, comprising:

a machine-readable storage medium; and machine-readable program code, stored on the machine-readable storage medium, having instructions to receive a query, said query including a query characteristic, wherein said query characteristic includes a query type and at least one query parameter;

select one among a plurality of lists, the selection being based on the query characteristic; and transmit a response relating to said query, wherein said selected list comprises a plurality of entries, the response is based at least in part on data provided by one among said plurality of data providers, each among said plurality of entries includes a query type alias and parameter conversion information, and for each among said plurality of entries, the corresponding query type alias comprises a mapping of at least a portion of the query type into a namespace of the corresponding data provider.

16. The program code storage device of claim 15, wherein the parameter conversion information includes at least one among a request format item and a response format item.

17. A system, comprising:

a data resolver configured and arranged to receive a query including a query characteristic, to select one among a plurality of lists, the selection being based on the query characteristic, and to transmit a response to said query, and a plurality of data providers, wherein at least two among said plurality of data providers are configured and arranged to supply data responsive to said query;

wherein said query characteristic includes a query type and at least one query parameter, said selected list comprises a plurality of entries, the response is based at least in part on data provided by one among said plurality of data providers, each among said plurality of entries includes a query type alias and parameter conversion information, and for each among said plurality of entries, the corresponding query type alias comprises a mapping of at least a portion of the query type into a namespace of the corresponding data provider.

18. The system according to claim 17, wherein the parameter conversion information includes at least one among a request format item and a response format item.

* * * * *